United States Patent [19]

Preston

[11] Patent Number: 4,862,046
[45] Date of Patent: Aug. 29, 1989

[54] ZOOM MOTOR CONTROL

[76] Inventor: Howard J. Preston, 920 Centinela Ave., Santa Monica, Calif. 90403

[21] Appl. No.: 421,793

[22] Filed: Sep. 23, 1982

[51] Int. Cl.$^4$ ................................................. G05B 1/06
[52] U.S. Cl. ..................................... 318/467; 318/286; 318/468; 318/488
[58] Field of Search .............. 318/640, 663, 286, 467, 318/468, 469, 488; 354/195.1, 195.11, 195.12, 195.13, 199, 200, 201, 195, 197, 198; 350/429, 430, 521

[56] References Cited

U.S. PATENT DOCUMENTS

| 2,571,454 | 10/1951 | Jones et al. | 318/488 |
| 2,810,256 | 2/1954 | Geyer et al. | 318/488 |
| 2,843,810 | 7/1958 | Carr | 318/488 |
| 3,649,898 | 3/1972 | Inoue | 318/483 |
| 3,733,532 | 5/1973 | Hill | 318/286 X |
| 3,834,796 | 9/1974 | Komine | 350/429 |

FOREIGN PATENT DOCUMENTS

| 2910820 | 10/1980 | Fed. Rep. of Germany | 354/195 |
| 56-50326 | 4/1979 | Japan | 354/197 |
| 56-50327 | 4/1979 | Japan | 354/197 |
| 56-50328 | 4/1979 | Japan | 354/197 |

Primary Examiner—Bentsu Ro
Attorney, Agent, or Firm—W. Edward Johansen

[57] ABSTRACT

The present invention is a zoom motor control for controlling an electric motor for use in combination with an auto zoom device for a movie camera. The auto zoom device includes a rotating member driven by the electric motor and a zoom-lens tube rotating member. The zoom motor control includes a rectangular housing which an operator of the movie camera may comfortably hold in his hand and a strain gauge sensor which is mechanically coupled to the rectangular housing. The strain gauge sensor is disposed so that the operator may apply with his thumb a varying amount of pressure in either direction. The strain gauge sensor has an output signal which is proportional to the varying amount of pressure. The zoom motor control includes a control circuit for converting the output signal of the strain gauge sensor to a control signal for controlling the electric motor of the auto zoom device. The control circuit is disposed in a hollow cavity of the rectangular housing and is electrically coupled to the strain gauge sensor. The circuit zoom motor also includes a multi-turn potentiometer which controls the maximum zoom speed of the auto zoom device and a high/low speed switch for lowering the maximum zoom speed of the auto zoom device by a fixed amount. The circuit zoom motor further includes a "zap" switch which allows the operator to drive the electric motor of the auto zoom device at high speed without having to change the maximum speed setting.

3 Claims, 2 Drawing Sheets

ZOOM MOTOR CONTROL

BACKGROUND OF THE INVENTION

1. Field of the Invention

The present invention relates to a zoom motor control for use in combination with an auto zoom device of a movie camera and more particularly to a zoom motor control which incorporates a strain gauge sensor and which an operator, who controls the auto zoom device by pressing the strain gauge sensor with his thumb, has sensitive tactile feedback and therefore substantially better control over the auto zoom device.

2. Background of the Prior Art

U.S. Pat. No. 3,834,796, entitled *"Auto Zoom Device for a Motion Picture Camera"*, issued to Yoshio Komine on September 10, 1974, teaches an auto zoom device for a motion picture camera wherein the zoom motor control can make a changeover from auto zoom by an electric motor to manual zoom. The auto zoom device includes a engaging-disengaging mechanism which is disposed between a rotating member and a zoom lens rotating tube member. An electric motor drives the rotating member which in turn drives the zoom lens rotating tube member. A change-over member permits a changeover between auto zoom and manual zoom. A rotating lever shifts the engaging-disengaging mechanism between operative and inoperative positions in an interlocking relationship with the change-over member. A quick zoom-up operating mechanism is cooperable with the rotating lever independently of the changeover member thereby permitting quick zoom-up in either state, auto zoom or manual zoom.

A description of a 12-V/dc servo zoom drive motor appears in the Journal of the Society of Motion Picture and Television Engineers, Volume 87, October 1978, page 742. The control for the servo motor is in the form of a grip which can be attached to the camera or to a tripod handle. The upper cone-shaped section of the grip has a thumb recess that rotates in order to control zoom-in, zoom-out and zoom speed. The servo system senses variations in the mechanical load and electrical power and automatically compensates. A separate control on the grip pre-establishes maximum zoom speed wherein an operator can predetermine the fastest speed needed for the zoom and concentrate on the smooth "feathering" of the effect. The drive motor operates from 12 volt, direct current power supplies.

Cinema Products Corporation has published on Dec. 1, 1981 a second edition of its technical manual entitled *J-4 Zoom Control and Motor,* in which there is a description of a J-4 Zoom Control System which is used to control zoom functions of cinema lenses. The J-4 Zoom Control System includes a joystick control, an electronic control box and a J-4 silent servo motor. The joystick control may be held in the hand or attached to the handle of the tripod. The joystick thumbwheel controls the direction and speed of the zoom. The maximum speed of the zoom is controlled by a knob on the electronic control box. The speed range of the joystick may therefore be very wide or intentionally limited as the situation dictates. The thumbwheel also controls power to the electronic control box and its use conserves battery power and eliminates a separate on/off switch. The J-4 silent servo motor includes a tachometer.

The J-4 Zoom Control System requires mechanical adjustment to the joystick control and it is difficult to obtain a smooth zoom of the lens of the movie camera.

SUMMARY OF THE INVENTION

In view of the foregoing factors and conditions which are characteristic of the prior art it is the primary object of the present invention to provide a zoom motor control for use in combination with an auto zoom device of a movie camera wherein the zoom motor control incorporates a strain gauge sensor and which an operator, who controls the auto zoom device by pressing the strain gauge sensor with his thumb, has sensitive tactile feedback and therefore substantially better control over the auto zoom device.

It is another object of the present invention to provide a zoom motor control for use in combination with a an auto zoom device of a movie camera wherein the zoom motor control has no moving parts thereby insuring high reliability.

It is still another object of the present invention to provide a zoom motor control for use in combination with a an auto zoom device of a movie camera wherein the zoom motor control does not have a dead zone in the force sensor so that "feathering" is virtually automatic and there is no abrupt change of zoom speed.

In accordance with the present invention an embodiment of a zoom motor control for controlling an electric motor for use in combination with an auto zoom device for a movie camera is described. The auto zoom device includes a rotating member driven by the electric motor and a zoom-lens tube rotating member. The zoom motor control includes a rectangular housing which an operator of the movie camera may comfortably hold in his hand and a strain gauge sensor which is mechanically coupled to the rectangular housing. The strain gauge sensor is disposed so that the operator may apply with his thumb a varying amount of pressure in either direction. The strain gauge sensor has an output signal which is proportional to the varying amount of pressure. The zoom motor control includes a control circuit for converting the output signal of the strain gauge sensor to a control signal for controlling the electric motor of the auto zoom device. The control circuit is disposed in a hollow cavity of the rectangular housing and is electrically coupled to the strain gauge sensor. The circuit zoom motor also includes a multi-turn potentiometer which controls the maximum zoom speed of the auto zoom device and a high/low speed switch for lowering the maximum zoom speed of the auto zoom device by a fixed amount. The circuit zoom motor further includes a "zap" switch which allows the operator to drive the electric motor of the auto zoom device at high speed without having to change the maximum speed setting.

The features of the present invention which are believed to be novel are set forth with particularity in the appended claims.

Other claims and may of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
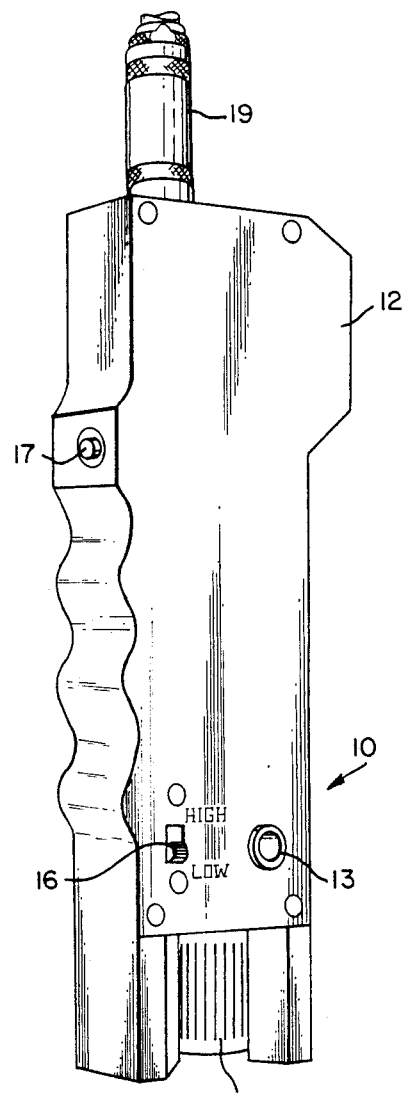
FIG. 1 is a perspective drawing which shows the front and left side of a zoom motor control for use in combination with an auto zoom device of a movie camera wherein the zoom motor control has been constructed in accordance with the principles of the present invention.

In order to best understand the present invention it is necessary to refer to the following description of its preferred embodiment in conjunction with the accompanying drawing. Referring to FIG. 1 in combination with FIG. 2 and FIG. 3 zoom motor control 10 for controlling an electric motor 11 for use in combination with an auto zoom device for a movie camera. The auto zoom device includes a rotating member driven by the electric motor 11 and a zoom-lens tube rotating member.

Figure 2:
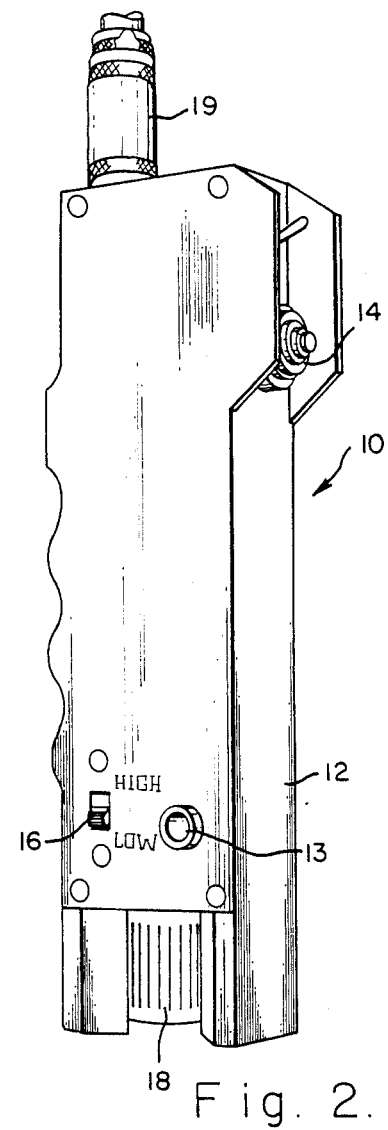
FIG. 2 is a perspective drawing which shows the front and right side of the zoom motor control of FIG. 1.
Figure 4:
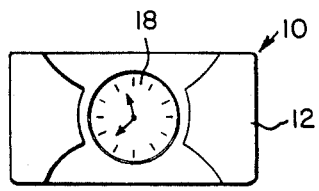
FIG. 4 is bottom plan view of the zoom motor control of FIG. 1.

Referring to FIG. 1 in conjunction with FIG. 2 the zoom motor control 10 includes a rectangular housing 12 which has a light emitting diode 13 and which an operator of the movie camera may comfortably hold in his hand and a strain gauge sensor 14 which is mechanically coupled to the rectangular housing 12. The strain gauge sensor 14 is disposed so that the operator may apply with his thumb a varying amount of pressure in either direction. The strain gauge sensor 14 has an output signal which is proportional to the varying amount of pressure.

Figure 3:
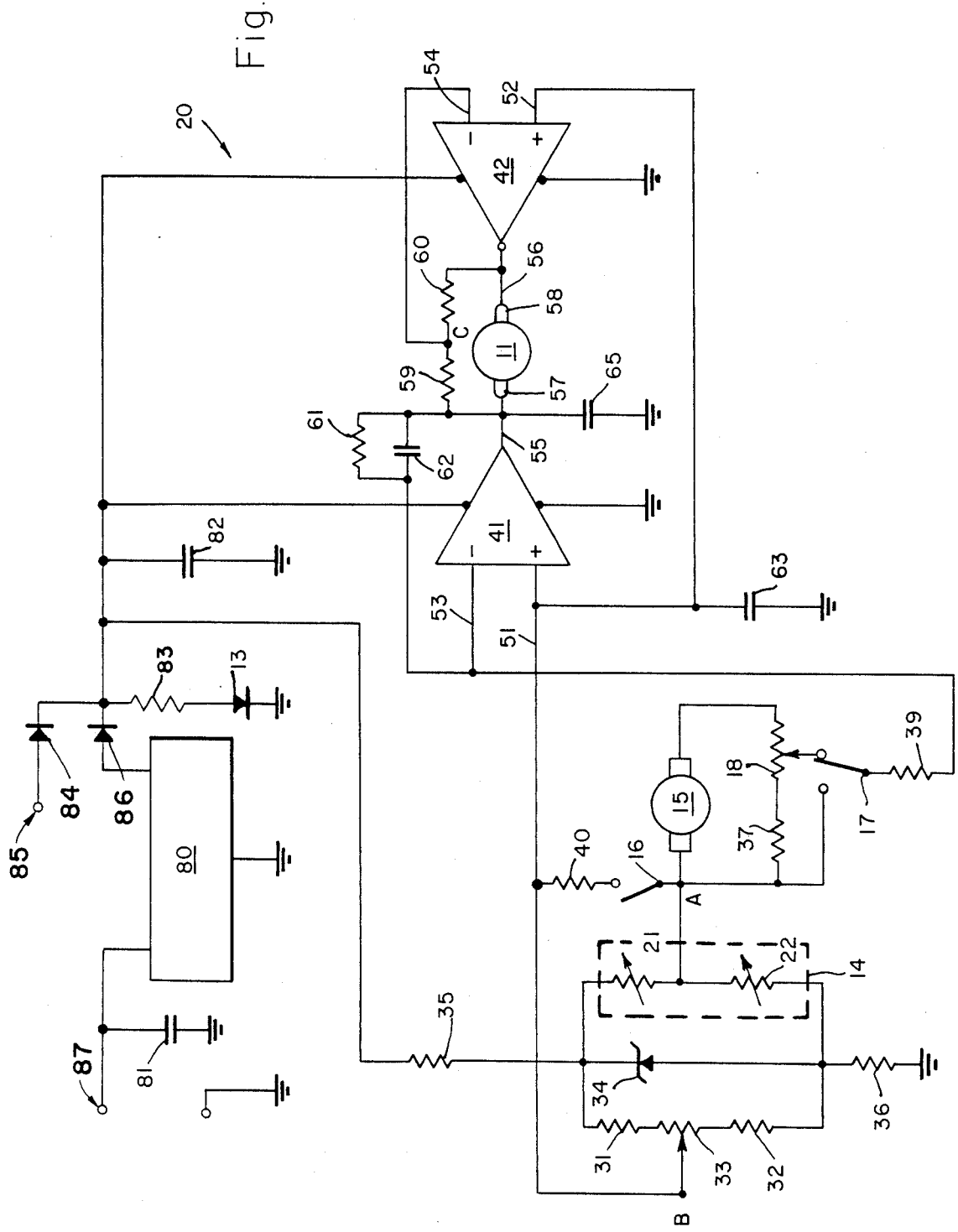
FIG. 3 is a circuit diagram of the control circuit of the zoom motor control of FIG. 1.

Referring to FIG. 1 in conjunction with FIG. 3 the electric motor 11 is mechanically coupled to a tachometer 15 and the zoom motor control includes a high/low switch 16, a "zap" switch 17 and a multi-turn potentiometer 18. A cable and a connector 19 electrically couples the zoom motor control 10 to the electric motor 11. The zoom motor control 10 also includes a control circuit 20 for converting the output signal of the strain gauge sensor 14 to a control signal for controlling the electric motor 11 of the auto zoom device. The control circuit 20 is disposed in a hollow cavity of the rectangular housing 12 and is electrically coupled to strain gauge sensor 14. The zoom motor control 10 also includes the multi-turn potentiometer 18 which controls the maximum zoom speed of the auto zoom device and the high/low speed switch 16 for lowering the maximum zoom speed of the auto zoom device by a fixed amount. The zoom motor control 10 further includes the "zap" switch 17 which allows the operator to drive the electric motor 11 of the auto zoom device at high speed with having to change the maximum speed setting.

Referring to FIG. 3 the strain guage sensor 14 is functionally equivalent to an electrical circuit including a first variable resistor 21 and a second variable resistor 22 which are electrically coupled in parallel to a first input terminal of the tachometer 15. The control circuit 20 also includes the first and a second resistor 31 and 32 which are electrically coupled to a first potentiometer 33 and the first and second variable resistors 21 and 22, respectively, in series. A zener diode 34 electrically couples the first and second resistors 31 and 32. A third resistor 35 and a fourth resistor 36 are electrically coupled to a positive voltage source and ground, respectively, and are electrically coupled to the first and second variable resistors 21 and 22, and the first and second resistors 31 and 32, respectively.

The strain gauge sensor 14 functionally includes the first and second variable resistors 21 and 22 and forms one half of a wheatstone-type bridge with the first and second resistors 31 and 32 along with the first potentiometer 33 forming the other half of the wheatstone-type bridge. The Zener diode 34 in conjunction with the equal valued third and fourth resistors 35 and 36 maintains a constant voltage across the wheatstone-type bridge. The constant voltage is determined by the breakdown voltage of the Zener diode 34 while the equal resistive values of the third and fourth resistors 35 and 36 insure that when no force is applied to the strain gauge sensor 14 the voltage at point A is a potential approximating one half of the operating voltage. Since the first and second resistors 31 and 32 are equal in resistive value the first potentiometer 33 is adjusted so that the potential at point B is the same as the potential at point A when no force is applied to the strain gauge sensor 14. The breakdown voltage of the Zener diode 34 is chosen to be considerably below the operating voltage at for two reasons one of which is to minimize drift of the voltage at point A as a result of self-heating effects in resistors because power dissipation increases as the square of the applied voltage. The other reason is that the constant applied voltage prevents drift of the voltage at point A relative to point B as the supply voltage varies which may result in the resistances of the first and second variable resistors 21 and 22 varying at separate rates with applied voltages.

The tachometer 15 has a second input terminal. A fifth resistor 37 and the multi-turn potentiometer 18 are electrically coupled in series to the first and second terminals of the tachometer 15 in order to provide speed control. A sixth resistor 39 is electrically coupled to the input terminal of the multi-turn potentiometer 18 and to the "zap" switch 17. When the "zap" switch 17 is in a first position the "zap" switch 17 is electrically coupled to the multi-turn potentiometer 18. When the "zap" switch 17 is in a second position the "zap" switch 17 is electrically coupled to point A. The control circuit produces output signals at the sixth resistor 39 which are proportional to the mechanically sensed variables of the tachometer 15 and the strain gauge sensor 14. A seventh resistor 40 is electrically coupled to the wiper of the first potentiometer 33 and to the high/low switch 16. When the high/low switch 16 is in a closed position points A and B are electrically coupled together through the seventh resistor 40.

When the high/low switch 16 is set in the low position the high/low switch 16 loads the output of the wheatstone-type bridge across points A and B with a seventh resistor 40 considerably smaller than the value of the first and second resistors 31 and 32. The seventh resistor 40 is chosen to decrease the output of the wheatstone-type bridge by a factor of ten to allow moderate forces which an operator applies to the strain gauge sensor 14 to result in motor speeds one tenth of the motor speeds for equivalent forces when the high/low switch 16 is in the high position.

Referring still to FIG. 3 the control circuit 20 further includes a first and second amplifiers 41 and 42 which amplifies the output signals from the seventh resistor 40 and the first potentiometer 33 so that the amplified output signals may drive the electric motor 11 with the first amplifier 41 being electrically coupled to the sixth resistor 39. The first and second amplifiers 41 and 42 have non-inverting input terminals 51 and 52, inverting input terminals 53 and 54 and output terminals 55 and 56 which are electrically coupled to first and second input terminals 57 and 58 of the electric motor 11. The inverting input terminal 54 of the second amplifier 42 is electrically coupled to the output terminals 55 and 56 of both the first and second amplifiers 41 and 42 through an eighth resistor 59 and a ninth resistor 60, respectively. The inverting input terminal 53 of the first amplifier 41 is also electrically coupled to the output terminal 55 of the first amplifier 41 through the tenth resistor 61 and the first capacitor 62, wherein the tenth resistor 61 and the first capacitor 62 are electrically coupled in parallel to each other. The non-inverting input terminals 53 and 54 of the first and second amplifiers 41 and 42 are electrically coupled together to the wiper of the first potentiometer 33 and to ground through the second capacitor 63.

The multi-turn potentiometer 18 controls the maximum speed of the electric motor 11. The position of the wiper of the multi-turn potentiometer 18 determines the fraction of the tachometer voltage applied to the inverting input of the first amplifier 41. The tachometer voltage is linearly proportional to the motor speed. If k is the fractional amount of the full tachometer voltage output which appears at the wiper of the potentiometer 18 the first amplifier 41 forces the following approximate relationship:

$$(k) \times (\text{motor speed}) = \text{applied pressure},$$

therefore for a given applied pressure the motor speed varies inversely with k. The low speeds correspond to a large fraction k of the tachometer voltage being applied to the inverting input of the first amplifier 41.

This configuration has the advantage that only moderate amounts of amplifier gain are necessary for excellent velocity control at slow motor speeds. This obviates the need to implement a dead zone which is a range of pressure which when applied to the strain gauge sensor 14 will not result in motion of the electric motor 11. In this way small amounts of drift in the potential at point A when amplified by the first and second amplifiers 41 and 42 will not result in sufficient voltage to allow the electric motor 11 to turn against its load.

The "zap" switch 17 is a single pole, double throw momentary switch. The normally closed position connects the tachometer voltage appearing at the wiper of the multi-turn potentiometer 18 to the inverting input 53 of the first amplifier 41 through the sixth resistor 39. When a high speed return is required the operator presses the "zap" switch 17 thereby connecting the first amplifier 41 directly to point A. Without the negative feedback provided by the tachometer 15 the electric motor 11 sees a voltage directly proportional to the potential difference between the points A and B, regardless of the setting of the multi-turn potentiometer 18. Only a moderate amount of pressure applied to the strain gauge sensor 14 results in a sufficient voltage difference between points A and B to drive the electric motor 11 at full speed.

The gain $G_1$ of the first amplifier 41 is determined by the ratio of the resistances, $R_{10}$ and $R_6$, of the tenth and sixth resistors 61 and 39, respectively, and is defined by the equation: $G_1 = R_{10}/R_6$. The first capacitor 62 lowers the amplifier bandwith so as to exclude noise caused by the tachometer 15 or picked up by the cables connecting the tachometer 15 to the zoom motor control 10. A second capacitor 63 and a third capacitor 65 bypass to ground any radio frequency energy which is conducted into the zoom motor control 10 by the motor cable connection.

The combination of the first and second amplifiers 41 and 42 allow the electric motor 11 to be driven bidirectionally from a single supply voltage with points A and B at equal voltage potential. The output of the first and second amplifiers 41 and 42 will be at approximately the voltage potential of the voltage potential at point B, namely one half of the operating voltage. The force which is applied to the strain gauge sensor 14 the output of the first amplifier 41 changes. Since the eighth and ninth resistors 59 and 60 are chosen to be equal, the second amplifier 42 tries to force the voltage potential at point C to equal the voltage potential at point B. It does this by varying its output potential by the same amount as the output of the first amplifier 41 varies from point B but in the opposite direction.

The dc-dc converter circuit 80 boosts the input voltage allowing the zoom motor control 10 to operate from supply voltages which are lower than would be required for optimum operation. The fourth and fifth capacitors 81 and 82 filter out the ac components caused by the operation of the dc-dc converter 80. The light emitting diode 13 in conjunction with the resistor 83 provides a visual indication of the applied power. A third diode 84, which is electrically coupled to a high voltage input 85, and a fourth diode 86, which is electrically coupled to a low voltage input 87, prevent damage to the control circut 20 due to either accidental polarity reversal or simultaneously applied supply voltages to both the high and low voltage inputs 85 and 87.

From the foregoing it can be seen that a zoom motor control for use in combination with an auto zoom device of a movie camera has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A zoom motor control for controlling an electric motor for use in combination with an auto zoom device for a movie camera including a rotating member driven bu the electric motor and a zoom-lens tube rotating member with the electric motor being mechanically coupled to a tachometer, said zoom motor control comprising:

a. a rectangular housing having a hollow cavity which an operator of the movie camera may comfortably hold said rectangular housing in his hand;

b. a strain gauge sensor which is mechanically coupled to said rectangular housing and which is disposed so that the operator may apply with his thumb a varying amount of pressure in either direction wherein said strain gauge sensor has an output signal which is proportional to the amount of pressure which the operator applies with his thumb to said strain gauge sensor whereby said strain gauge sensor is functionally equivalent to an electrical circuit including a first variable resistor and a second variable resistor which are electrically coupled in parallel to the tachometer; and c. a control circuit means for converting the output signal of said strain gauge sensor to a control signal for controlling the electric motor of the auto zoom device wherein said control circuit means is disposed in said cavity of said rectangular housing and is electrically coupled to said strain gauge sensor, said control circuit means including:
  a. a multi-turn potentiometer which controls a maximum zoom speed setting of the auto zoom device;
  b. a high/low speed switching means for lowering a maximum zoom speed of the auto zoom device by a fixed amount wherein said high/low speed switching means is electrically coupled to said multi-turn potentiometer;
  c. a "zap" switch which allows the operator to drive the electric motor of the auto zoom device at high speed without having to change the maximum speed setting of said multi-turn potentiometer and said high/low switching means;
  d. a first resistor electrically coupled to a first potentiometer and the first variable resistor in series;
  e. a second resistor electrically coupled to said first potentiometer and the second variable resistor in series;
  f. a third resistor which is electrically coupled to a positive voltage source and which is electrically coupled to said first variable resistor and said first resistor; and
  g. a fourth resistor which is electrically coupled to ground and which is electrically coupled to said second variable resistor and said second resistor; and
  h. a first diode which is electrically coupled to said third and fourth resistors.

2. A zoom motor control for controlling an electric motor for use in combination with an auto zoom device for a movie camera according to claim 1 wherein the tachometer has a first input terminal and a second input terminal, a fifth resistor and said multi-turn potentiometer are electrically coupled in series to the first and second input terminals of the tachometer in order to provide speed control and wherein said control circuit means also comprises:
  a. a sixth resistor which is electrically coupled to an output terminal of said first potentiometer and to said high/low speed switching means wherein said high/low speed switching means in a closed position is electrically coupled to the fifth resistor and the first input terminal of he tachometer;
  b. a seventh resistor which is electrically coupled to an output terminal of said multi-turn potentiometer and to said "zap" switch wherein said "zap" switch in a first position is electrically coupled to said seventh resistor and in a second position is electrically coupled to the fifth resistor and the fist input terminal of the tachometer whereby said control circuit means produces output signals at said seventh resistor and said first potentiometer which are proportional to the mechanically sensed variables of the tachometer and said strain gauge sensor; and
  c. amplifying means for amplifying the output signals from said seventh resistor and said first potentiometer so that the amplified output signals may drive the electric motor with said amplifying means being electrically coupled to said seventh resistor and said first potentiometer.

3. A zoom motor control for controlling an electric motor for use in combination with an auto zoom device for a movie camera according to claim 2 wherein the electric motor has a first input terminal and a second input terminal and wherein said amplifying means comprises:
  a. a first amplifier which has a first input terminal, a second input terminal and an output terminal which is electrically coupled to the first input terminal of the electric motor with said first input terminal of said first amplifier being electrically coupled to the output terminal of said first potentiometer and said second input terminal of said first amplifier being electrically coupled to said seventh resistor;
  b. a second amplifier which has a first input terminal, a second input terminal and an output terminal which is electrically coupled to the second input terminal of the electric motor with said first input terminal of said second amplifier being electrically coupled to the output terminal of said first potentiometer; and
  c. network means for electrically coupling said second input terminal of said first amplifier to said second input terminal of said second amplifier.

* * * * *